US008254711B2

United States Patent
Xiao et al.

(10) Patent No.: US 8,254,711 B2
(45) Date of Patent: Aug. 28, 2012

(54) SYSTEM AND METHOD FOR PROCESSING DIGITAL NOISE IN A DIGITAL IMAGE

(75) Inventors: Wei-Qing Xiao, Shenzhen (CN); Chien-Fa Yeh, Taipei Hsien (TW); Chung-I Lee, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 416 days.

(21) Appl. No.: 12/700,002

(22) Filed: Feb. 4, 2010

(65) Prior Publication Data
US 2011/0052092 A1    Mar. 3, 2011

(30) Foreign Application Priority Data
Aug. 27, 2009  (CN) .......................... 2009 1 0306203

(51) Int. Cl.
*G06K 9/00* (2006.01)
*G06K 9/40* (2006.01)

(52) U.S. Cl. ....................................... 382/254; 382/261
(58) Field of Classification Search ........... 382/254–275
See application file for complete search history.

(56) References Cited

U.S. PATENT DOCUMENTS

| 5,317,420 A | * | 5/1994 | Kuwahara ..................... 358/463 |
| 5,982,940 A | * | 11/1999 | Sawada ........................ 382/260 |
| 2002/0034337 A1 | * | 3/2002 | Shekter ........................ 382/275 |

* cited by examiner

*Primary Examiner* — Alex Liew
(74) *Attorney, Agent, or Firm* — Altis Law Group, Inc.

(57) ABSTRACT

A processing digital noise method generates a matrix according to pixel values of pixels of a digital image, and selects a sub-matrix from the matrix. The sub-matrix has the same dimensions as a digital noise sample and includes a pixel value of a pixel selected from the digital image. The digital noise sample is represented as a matrix composed of 0 and 1. The method compares the sub-matrix with the digital noise sample to determine whether or not all values in the sub-matrix and the digital noise sample are the same. If all values are the same, the method further searches 1 from the sub-matrix for locating digital noise of the digital image, and removes the digital noise of the digital image by changing the pixel values of the digital noise from 1 to 0.

20 Claims, 6 Drawing Sheets

$$\begin{bmatrix} 0,0,0,0 \\ 0,0,1,0 \\ 0,1,0,0 \\ 0,0,0,0 \end{bmatrix}$$ Sample 1 $$\begin{bmatrix} 0,0,0,0 \\ 0,1,1,0 \\ 0,0,0,0 \\ 0,0,0,0 \end{bmatrix}$$ Sample 2 $$\begin{bmatrix} 0,0,0,0 \\ 0,0,1,0 \\ 0,1,0,0 \\ 0,0,0,0 \end{bmatrix}$$ Sample 3 $$\begin{bmatrix} 0,0,0,0 \\ 0,0,1,0 \\ 0,1,0,0 \\ 0,0,0,0 \end{bmatrix}$$ Sample 4 $$\begin{bmatrix} 0,0,0,0 \\ 0,0,1,0 \\ 0,1,0,0 \\ 0,0,0,0 \end{bmatrix}$$ Sample 5

SYSTEM AND METHOD FOR PROCESSING DIGITAL NOISE IN A DIGITAL IMAGE

BACKGROUND

1. Technical Field

Embodiments of the present disclosure generally relate to digital image processing, and more particularly, to a system and method of reducing digital noise in a digital image.

2. Description of Related Art

Images produced by image capturing devices, as scanners and cameras, may contain noise, granularities, and other unwanted artifact(s) that diminish visual image fidelity. For example, an image may contain a pixel having a color that is inconsistent with the color of adjacent or surrounding pixel(s). Such irregularly colored pixels are commonly referred to as digital noise, noise print(s), or noise artifact(s).

The cause of digital noise in an image varies. However, in high ISO photography, less than ideal environmental conditions such as dust on the scanning bed, wrinkles in the source object to name a few, are common culprits.

BRIEF DESCRIPTION OF THE DRAWINGS

FIG. 4 including FIG. 4(A) and FIG. 4(B) shows examples of digital noise samples.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
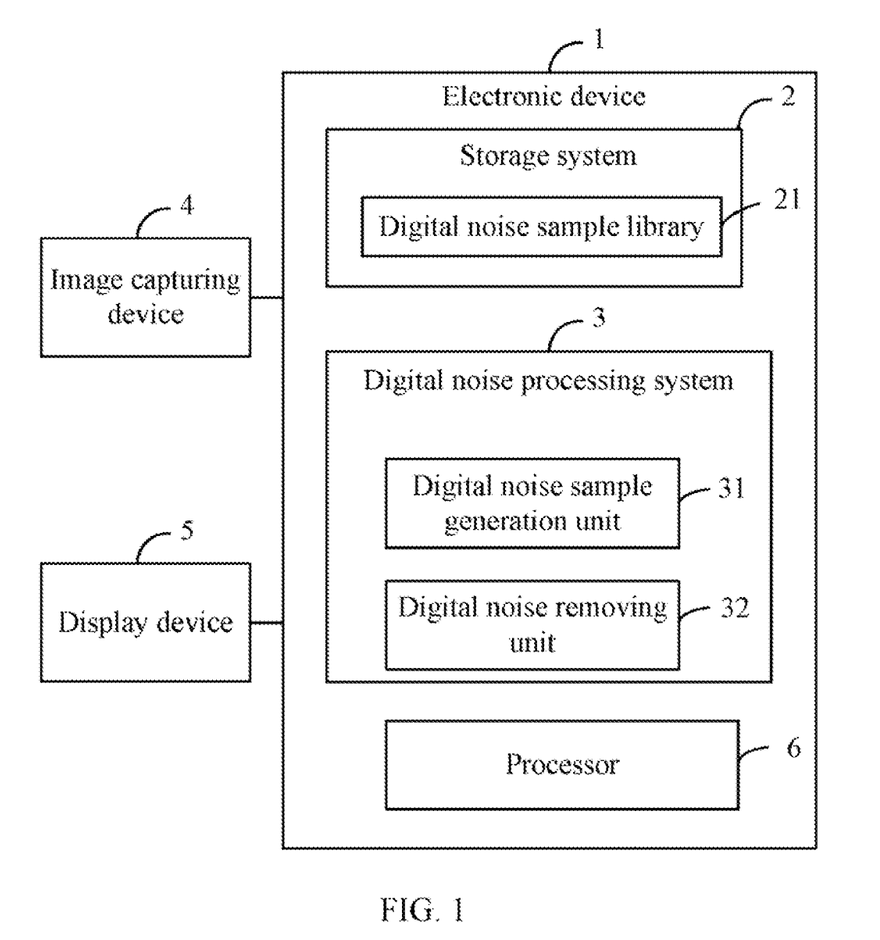
FIG. 1 is a block diagram of one embodiment of a digital noise processing system of an electronic device.

FIG. 1 is a block diagram of one embodiment of a digital noise processing system 3 of an electronic device 1. The electronic device 1 includes the digital noise processing system 3, a storage system 2 and a processor 6. The electronic device 1 may be, a computer or a smart mobile device, for example. The digital noise processing system 3 can process digital noise by removing the digital noise from a digital image.

In one embodiment, the storage system 2 includes a digital noise sample library 21 which stores one or more digital noise samples. In the present embodiment, the digital noise sample can be represented as a matrix composed of a plurality of values 0 and one or more values 1. The first row, the last row, the first column, and the last column of the matrix of the digital noise sample are composed of the values 0. In the present embodiment, the digital noise samples are automatically generated by the digital noise processing system 3 (see below description). In other embodiments, the digital noise samples of matrix format may be selected by users.

In the present embodiment, the electronic device 1 connects to an image capturing device 4 and a display device 5. The image capturing device 4 may be a scanner or a digital camera, used to capture the digital image. The digital image can be stored in the storage system 2. The display device 5 provides a user interface displaying the digital image.

In the present embodiment, the digital noise processing system 3 includes a digital noise sample generation unit 31 and a digital noise removing unit 32. The digital noise sample generation unit 31 includes a plurality of function modules (see below description referring to FIG. 2), and can generate one or more digital noise samples and store the one or more digital noise samples into the digital noise sample library 21 of the storage system 2. The digital noise removing unit 32 includes a plurality of function modules (vide infra, FIG. 3 description), and can remove digital noise by referencing the digital noise samples.

In one embodiment, one or more computerized codes of the functional modules of the digital noise sample generation unit 31 and the digital noise removing unit 32 may be stored in the storage system 2. In other embodiments, the digital noise sample generation unit 31 and the digital noise removing unit 32 may be included in an operating system (OS) of the electronic device 1, such as Unix, Linux, or Windows-based OS, embedded OS, or other compatible OS. The processor 6 of the electronic device 1 can execute any of the computerized codes of the functional modules.

Figure 2:
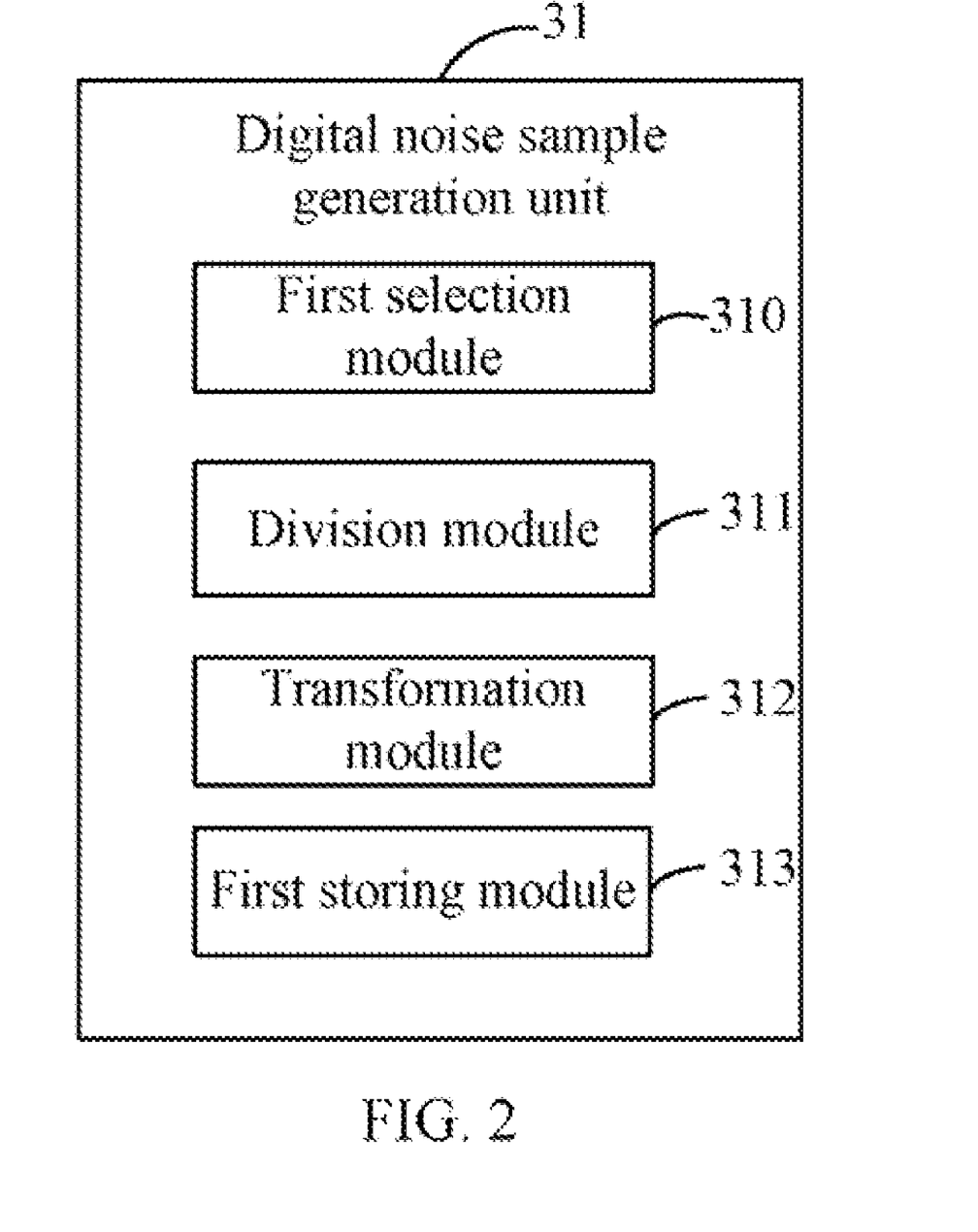
FIG. 2 is a block diagram of functional modules of a digital noise sample generation unit of the digital noise processing system of FIG. 1.

FIG. 2 is a block diagram of the functional modules of the digital noise sample generation unit 31. In one embodiment, the digital noise sample generation unit 31 includes a first selection module 310, a division module 311, a transformation module 312, and a first storing module 313.

The first selection module 310 selects a sample digital image from the storage system 2. In the present embodiment, the sample digital image can be a monochromic image that includes colors of white and black.

Figure 4A:
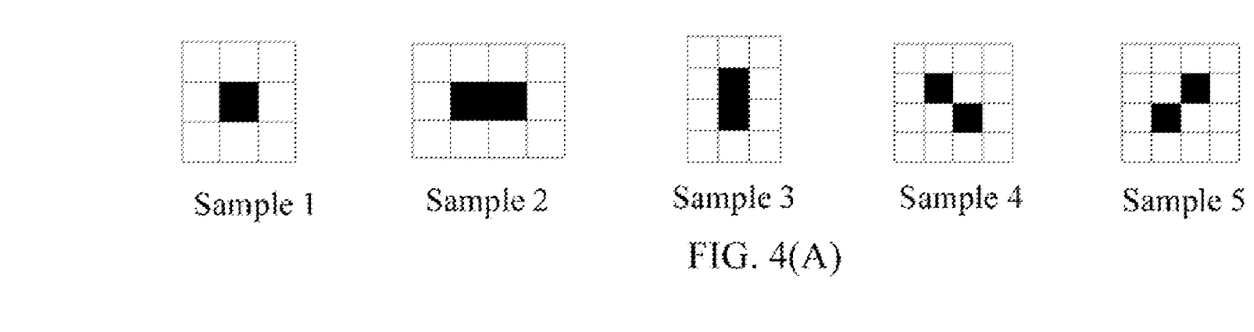

The division module 311 divides the sample digital image into a plurality of blocks in order to determine digital noise samples from the blocks. It should be understood that, the digital noise samples here are digital images. In one embodiment, each of the blocks includes at least 9 pixels. In one embodiment, the determination of the digital noise samples can be implemented according to user requirements. FIG. 4(A) shows five examples of the digital noise samples of image format. The image format may be, such as, BMP, TIFF, JPEG, or GIF.

Figure 4B:
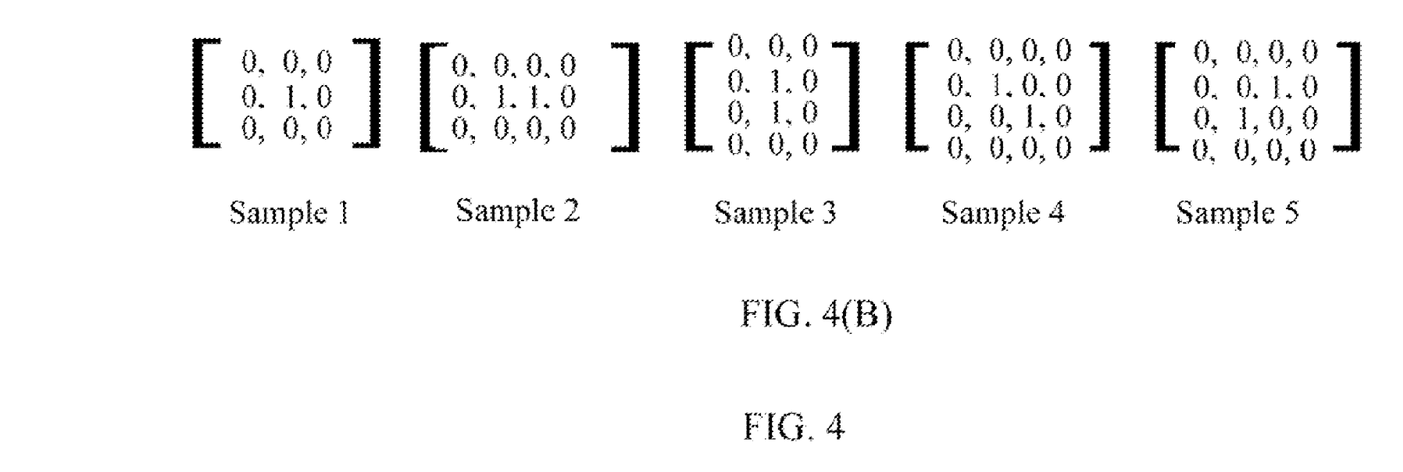

The transformation module 312 transforms the digital noise samples from the image format to a matrix format according to pixel values of the pixels therein. As aforementioned, the sample digital image can be a monochromic image, thus, the pixel values include a value 0 representing a white color and a value 1 representing a black color. FIG. 4(B) shows digital noise samples of the matrix format transformed from the digital noise samples of the image format shown in FIG. 4(A).

The first storing module 313 stores the digital noise samples of matrix format into the digital noise sample library 21 of the storage system 2.

Figure 3:
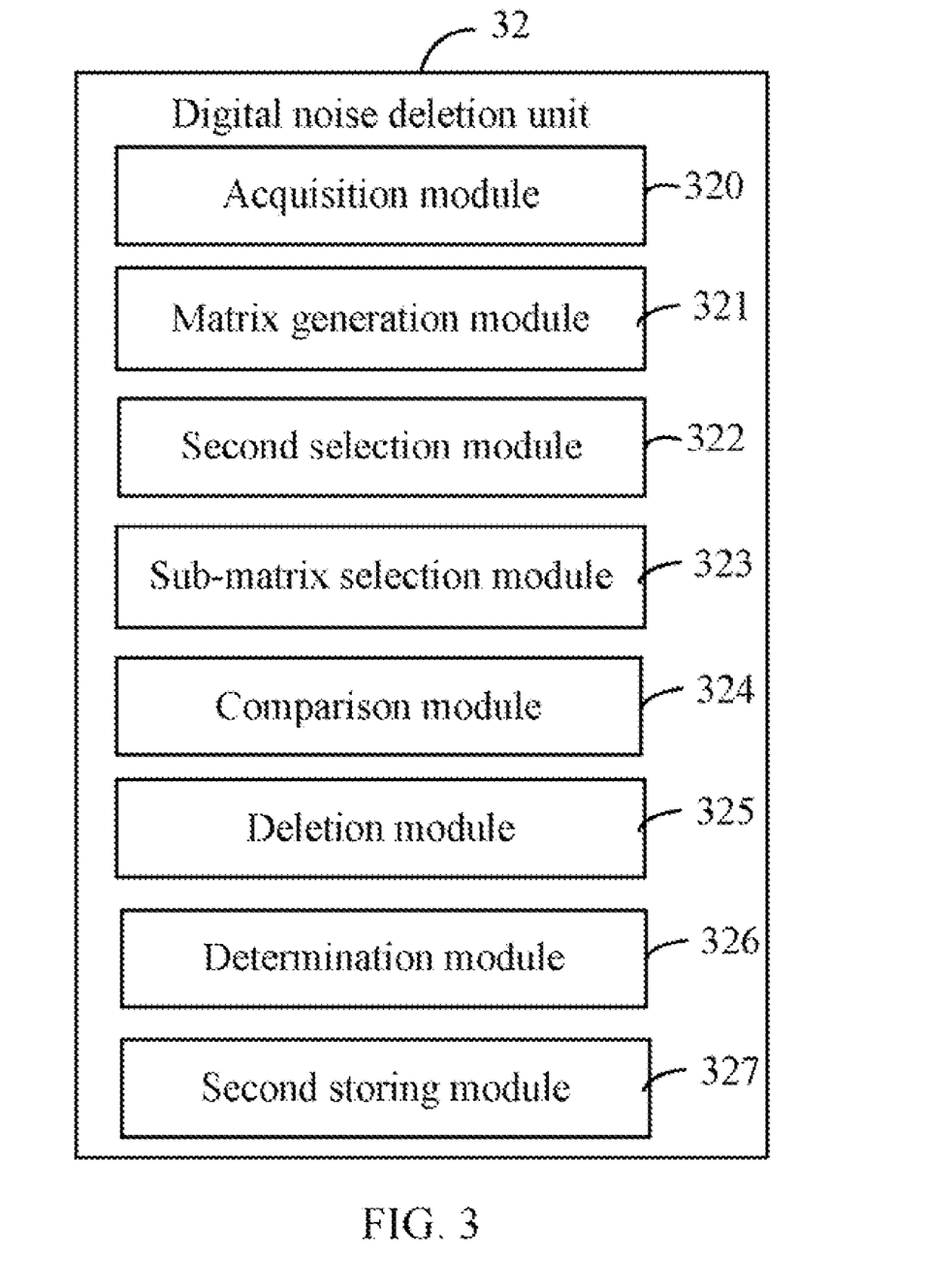
FIG. 3 is a block diagram of functional modules of a digital noise removing unit of the digital noise processing system of FIG. 1.

FIG. 3 is a block diagram of the functional modules of the digital noise removing unit 32. The digital noise removing unit 32 includes an acquisition module 320, a matrix generation module 321, a second selection 322, a sub-matrix selecting module 323, a comparison module 324, a removing module 325, a determination module 326, and a second storing module 327.

The acquisition module 320 acquires a digital image from the storage system 2. In the present embodiment, the digital image can be a monochromic image that includes colors of white and black.

The matrix generation module 321 generates an image matrix according to pixel values of pixels of the digital image. In the present embodiment, the image matrix is composed of one or more values 0 representing a white color, and one or more values 1 representing a black color.

The second selection module 322 selects pixel(s) of the digital image, and further operable to select digital noise sample(s) from the digital noise sample library 21. In the present embodiment, the selection of the pixel(s) may be according to a preset priority, and the selection of the digital noise sample may be random.

The sub-matrix selecting module 323 selects a sub-matrix from the image matrix, where the sub-matrix has the same dimensions as the selected digital noise sample and includes the pixel value of the selected pixel. In an example, if the selected pixel is (x, y) and the selected digital noise sample is a 3=3 matrix, the sub-matrix may include pixel values of pixels (x, y), (x+1, y), (x+2, y), (x, y+1), (x+1, y+1), (x+2, y+1), (x,y+2), (x+1, y+2), and (x+2, y+2).

The comparison module 324 compares the sub-matrix with the selected digital noise sample to determine whether or not all values in the sub-matrix and the selected digital noise sample are identical.

The removing module 325 locates digital noise in the digital image by searching values that do not represent the color white in the sub-matrix, if all values in the sub-matrix and the selected digital noise sample are identical. In the present embodiment, values not representing the color white are 1. Furthermore, the removing module 325 removes the digital noise in the digital image by changing the pixel values of the digital noise to the value representing the color white, namely changing the values 1 to the values 0 in the present embodiment.

The determination module 326 determines whether or not all pixels of the digital image have been selected and whether or not all the digital noise samples stored in the digital noise sample library 21 have been selected.

The second storing module 327 places the digital image in the storage system 2 after all the digital noise therein are removed.

Figure 5:
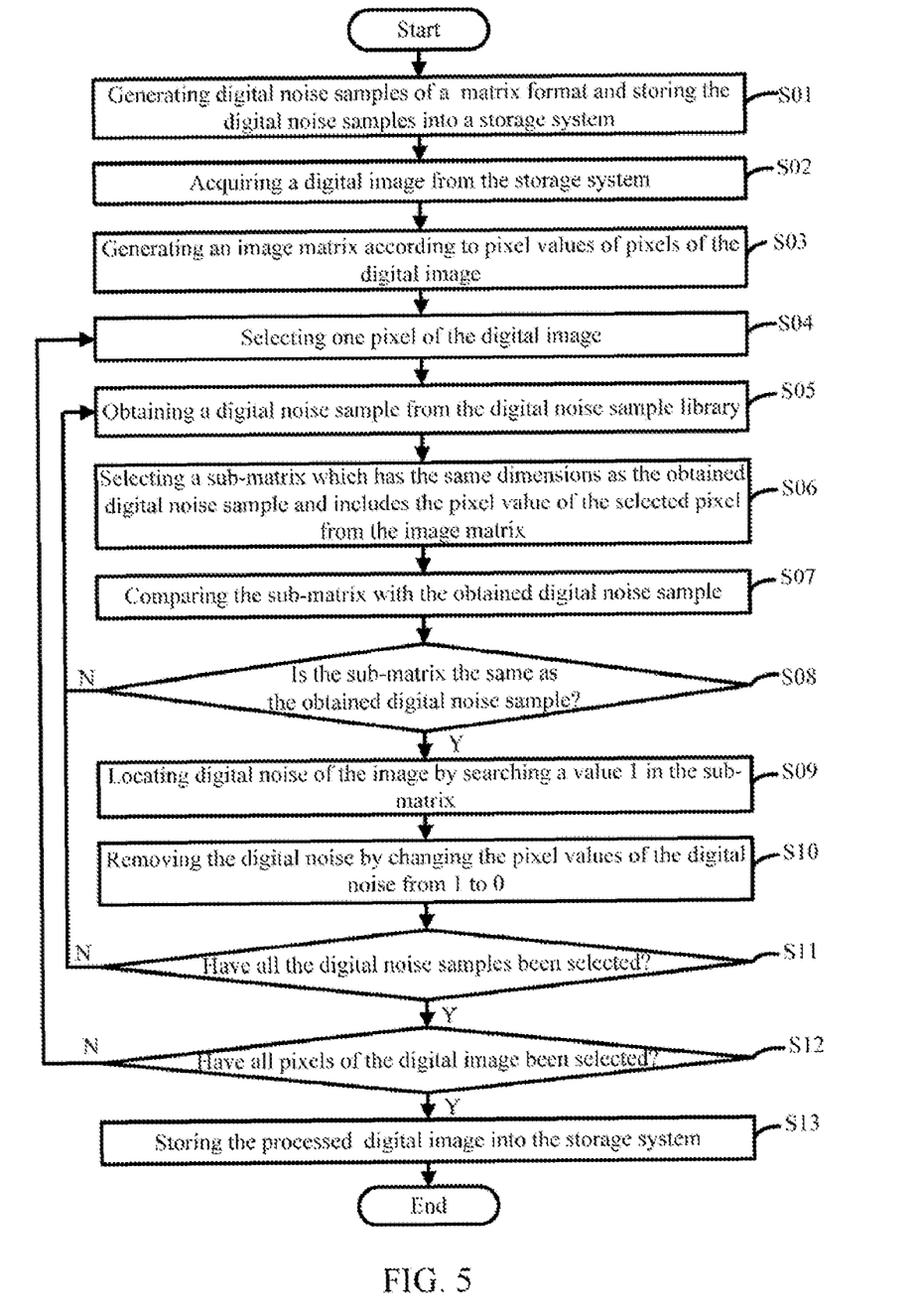
FIG. 5 is a flowchart of one embodiment of a method for processing digital noise in a digital image.

FIG. 5 is a flowchart of one embodiment of method for processing digital noise in a digital image. In one embodiment, the method can be performed by execution of computer readable program code by at least one processor of at least one computer system. Depending on the embodiment, additional blocks in the flow of FIG. 5 may be added, others removed, and the ordering of the blocks may be changed.

In block S01, the digital noise sample generation unit 31 generates one or more digital noise samples, and stores the digital noise samples into the digital noise sample library 21 of the storage system 2 (see below description referring to FIG. 6). In the present embodiment, the digital noise sample can be represented as a matrix composed of a plurality of values 0 and one or more values 1. The first row, the last row, the first column, and the last column of the matrix of the digital noise sample are composed of the values 0.

In block S02, the acquisition module 320 acquires a digital image from the storage system 2. In the present embodiment, the digital image is a monochromic image that includes colors of white and black.

In block S03, the matrix generation module 321 generates an image matrix according to pixel values of pixels of the digital image. In the present embodiment, the image matrix is composed of one or more values 0 representing a white color and one or more values 1 representing a black color.

In block S04, the second selection 322 selects a pixel from the digital image. In the present embodiment, the selection of the pixel may be according to a preset priority.

In block S05, the second selection 322 further selects a digital noise sample from the digital noise sample library 21. The selection of the digital noise sample may be random.

In block S06, the sub-matrix selecting module 323 selects a sub-matrix from the image matrix, where the sub-matrix has the same dimensions as the selected digital noise sample and includes the pixel value of the selected pixel. In an example, if the selected pixel is (x, y) and the selected digital noise sample is a 3=3 matrix, the sub-matrix may include pixel values of pixels (x, y), (x+1, y), (x+2, y), (x, y+1), (x+1, y+1), (x+2, y+1), (x,y+2), (x+1, y+2), and (x+2, y+2).

In block S07, the comparison module 324 compares the sub-matrix with the selected digital noise sample.

In block S08, the comparison module 324 determines whether or not all values in the sub-matrix and the selected digital noise sample are identical. Block S05 is repeated if at least one value in the sub-matrix is different from the selected digital noise sample. Block S09 is implemented if all values in the sub-matrix and the selected digital noise sample are identical.

In block S09, the removing module 325 locates digital noise of the digital image by searching values that do not represent the color white in the sub-matrix. In the present embodiment, the values that do not represent the color white are 1.

In block S10, the removing module 325 removes the digital noise from the digital image by changing the pixel values of the digital noise to the value representing the color white. In the present embodiment, changing the pixel values of the digital noise from 1 to 0.

In block S11 the determination module 326 determines whether or not all the digital noise samples stored in the digital noise sample library 21 have been selected. Block S05 is repeated if at least one digital noise sample has not been selected. Block S12 is implemented if all the digital noise samples stored in the digital noise sample library have been selected.

In block S12, the determination module 326 further determines whether or not all pixels in the digital image have been selected. Block S04 is repeated if at least one pixel of the digital image has not been selected. Block S13 is implemented if all pixels in the digital image have been selected.

In block S13, the second storing module 327 stores the digital image into the storage system 2.

Figure 6:
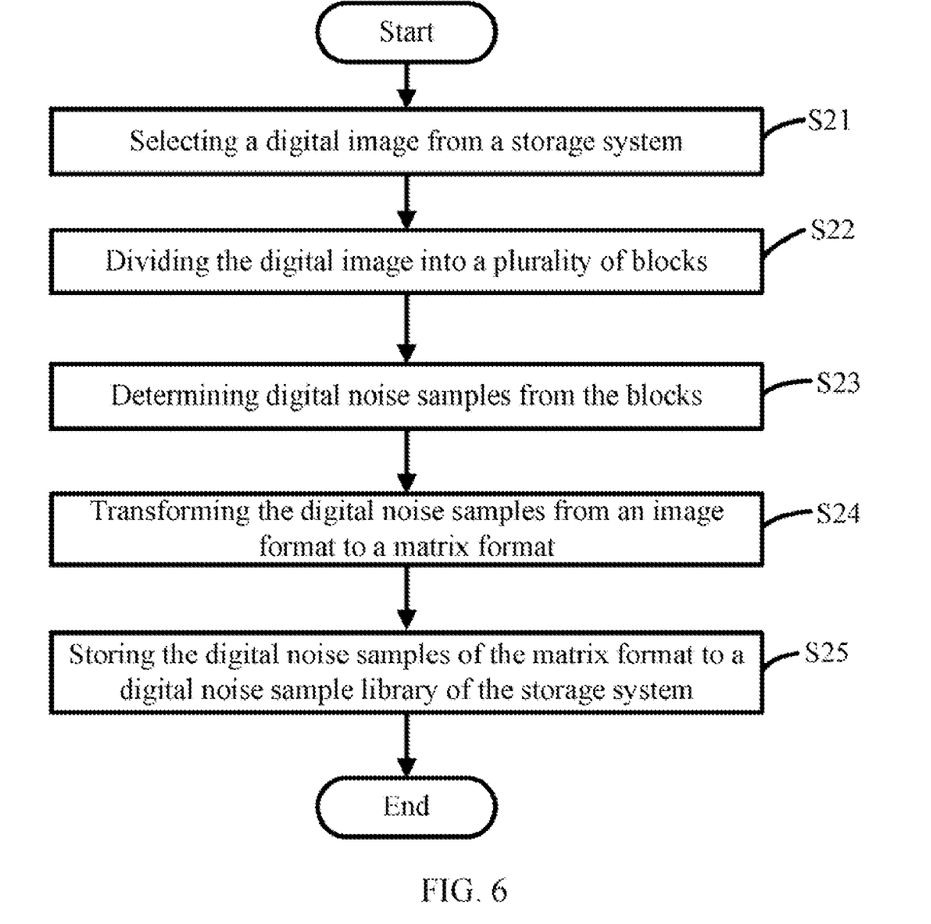
FIG. 6 is a flowchart of one embodiment of a method for generating digital noise samples in block S01 of FIG. 5.

FIG. 6 is a flowchart of one embodiment of method for generating the digital noise samples in bock S01 of FIG. 5. Depending on the embodiment, additional blocks in the flow of FIG. 6 may be added, others removed, and the ordering of the blocks may be changed.

In block S21, the first selection module 310 selects a sample digital image from the storage system 2. In the present embodiment, the sample digital image is a monochromic image.

In block S22, the division module 311 divides the sample digital image into a plurality of blocks. In the present embodiment, each of the blocks includes at least 9 pixels.

In block S23, the division module 311 further determines digital noise samples from the blocks. It should be understood that, the digital noise samples here are digital image of a format such as BMP, TIFF, JPEG, or GIF . In one embodiment, the determination of the digital noise samples may be implemented according to users requirements.

In block S24, the transformation module 312 transforms the digital noise samples from the image format to a matrix format according to pixel values of the pixels therein. As aforementioned, the digital image is a monochromic image, thus, the pixel values include a value 0 representing white and a value 1 representing black.

In block S25, the first storing module 313 stores the digital noise samples of matrix format into the digital noise sample library 21 of the storage system 2.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for processing digital noise in a digital image, the method comprising:
    (a) generating a plurality of digital noise samples, and storing the digital noise samples into a storage system, wherein each of the digital noise samples is represented as a matrix;
    (b) acquiring a digital image to be processed;
    (c) generating an image matrix according to pixel values of pixels of the digital image;
    (d) selecting a pixel of the digital image;
    (e) selecting a digital noise sample from the storage system;
    (f) selecting a sub-matrix from the image matrix, wherein the sub-matrix has the same dimensions as the selected digital noise sample and includes a pixel value of the selected pixel;
    (g) comparing the sub-matrix with the selected digital noise sample;
    (h) locating digital noise of the digital image by searching values which do not represent a white color in the sub-matrix upon condition that all values in the sub-matrix and the selected digital noise sample are identical;
    (i) removing the digital noise of the digital image by changing the pixel values of the digital noise to the value representing a white color;
    (j) repeating blocks (e) to (i) until all the digital noise samples stored in the storage system have been selected;
    (k) repeating blocks (d) to (j) until all pixels in the digital image have been selected; and
    (l) storing the digital image into the storage system.

2. The method as described in claim 1, wherein the digital image is a monochromic image.

3. The method as described in claim 1, wherein each of the digital noise samples is composed of a plurality of values 0 each representing a white color, and one or more values 1 each representing a black color.

4. The method as described in claim 3, wherein the first row, the last row, the first column, and the last column of the matrix of each digital noise sample are composed of the values 0.

5. The method as described in claim 1, wherein block (a) comprises:
    selecting a sample digital image from the storage system;
    dividing the sample digital image into a plurality of blocks;
    determining digital noise samples of an image format from the blocks;
    transforming the digital noise samples from the image format to the matrix format according to pixel values of the pixels therein; and
    storing the digital noise samples of matrix format into the storage system.

6. The method as described in claim 5, wherein the sample digital image is a monochromic image.

7. The method as described in claim 5, wherein each of the blocks comprises at least nine pixels.

8. A non-transitory storage medium having stored thereon instructions that, when executed by a processor of a computing device, cause the computing device to perform a method for processing digital noise in a digital image, the method comprising:
    (a) generating a plurality of digital noise samples, and storing the digital noise samples into a storage system, wherein each of the digital noise samples is represented as a matrix;
    (b) acquiring a digital image to be processed;
    (c) generating an image matrix according to pixel values of pixels of the digital image;
    (d) selecting a pixel of the digital image;
    (e) selecting a digital noise sample from the storage system;
    (f) selecting a sub-matrix from the image matrix, wherein the sub-matrix has the same dimensions as the selected digital noise sample and includes a pixel value of the selected pixel;
    (g) comparing the sub-matrix with the selected digital noise sample;
    (h) locating digital noise of the digital image by searching values which do not represent a white color in the sub-matrix upon the condition that all values in the sub-matrix and the selected digital noise sample are identical;
    (i) removing the digital noise of the digital image by changing the pixel values of the digital noise to a value representing a white color;
    (j) repeating blocks (e) to (i) until all the digital noise samples stored in the storage system have been selected;
    (k) repeating blocks (d) to (j) until all pixels in the digital image have been selected; and
    (l) storing the digital image into the storage system.

9. The non-transitory storage medium as described in claim 8, wherein the digital image is a monochromic image.

10. The non-transitory storage medium as described in claim 8, wherein each of the digital noise samples is composed of a plurality of values 0 each representing a white color, and one or more values 1 each representing a black color.

11. The non-transitory storage medium as described in claim 10, wherein the first row, the last row, the first column, and the last column of the matrix of each digital noise sample are composed of the values 0.

12. The non-transitory storage medium as described in claim 8, wherein block (a) comprises:
    selecting a sample digital image from the storage system;

dividing the sample digital image into a plurality of blocks;
determining digital noise samples of an image format from the blocks;
transforming the digital noise samples from the image format to the matrix format according to pixel values of the pixels therein; and
storing the digital noise samples of matrix format into the storage system.

13. The non-transitory storage medium as described in claim 12, wherein the sample digital image is a monochromic image.

14. The non-transitory storage medium as described in claim 12, wherein each of the blocks comprises at least nine pixels.

15. A system for processing digital noise in a digital image, the system comprising:
    a storage system;
    a digital noise sample generation unit operable to generate one or more digital noise examples, and store digital noise examples into the storage system, wherein the digital noise example is represented as a matrix;
    a digital noise removing unit operable to remove digital noise in a digital image acquired from the storage system by comparing an image matrix generated according to the digital image with the digital noise examples; and
    at least one processor that executes the digital noise sample generation unit and the digital noise removing unit.

16. The system as described in claim 15, wherein the digital noise sample generation unit comprises:
    a first selection module operable to select a sample digital image from the storage system;
    a division module operable to divide the sample digital image into a plurality of blocks for determining digital noise samples of an image format from the blocks;
    a transformation module operable to transform the digital noise samples from the image format to the matrix format according to pixel values of the pixels therein; and
    a first storing module operable to store the digital noise samples of matrix format into the storage system.

17. The system as described in claim 16, wherein each of the blocks comprises at least nine pixels.

18. The system as described in claim 16, wherein both of the digital image and the sample digital image are monochromic images.

19. The system as described in claim 15, wherein the digital noise sample is composed of a value 0 representing a white color and a value 1 representing a black color, and the first row, the last row, the first column and the last column of the matrix of the digital noise sample are composed of the value 0.

20. The system as described in claim 15, wherein the digital noise removing unit comprises:
    an acquisition module operable to acquire the digital image from the storage system;
    a matrix generation module operable to generate the image matrix according to pixel values of pixels of the digital image;
    a second selection module operable to select a pixel of the digital image one by one, and select a digital noise sample one by one from the storage system;
    a sub-matrix selecting module operable to select a sub-matrix from the image matrix, wherein the sub-matrix has the same dimensions as the selected digital noise sample and includes a pixel value of the selected pixel;
    a comparison module operable to compare the sub-matrix with the selected digital noise sample to determine whether or not all values in the sub-matrix and the selected digital noise sample are identical;
    a removing module operable to locate digital noise of the digital image by searching values which do not represent a white color in the sub-matrix upon condition that all values in the sub-matrix and the selected digital noise sample are identical, and operable to remove the digital noise of the digital image by changing the pixel values of the digital noise to a value representing a white color;
    a determination module operable to determine whether or not all pixels of the digital image have been selected and whether all the digital noise samples stored in the storage system have been selected; and
    a second storing module operable to store the digital image into the storage system after all the digital noise therein have been removed.

* * * * *